(12) United States Patent
Robinson et al.

(10) Patent No.: US 7,113,670 B2
(45) Date of Patent: Sep. 26, 2006

(54) METHOD AND DEVICE TO IMPROVE BACKLIGHT UNIFORMITY

(75) Inventors: James Robinson, Elmira (CA); Marc Drader, Kitchener (CA); Michael Purdy, Kitchener (CA)

(73) Assignee: Research in Motion Limited, Waterloo (CA)

( * ) Notice: Subject to any disclaimer, the term of this patent is extended or adjusted under 35 U.S.C. 154(b) by 80 days.

(21) Appl. No.: 10/940,988

(22) Filed: Sep. 15, 2004

(65) Prior Publication Data

US 2006/0056197 A1 Mar. 16, 2006

(51) Int. Cl.
G02B 6/26 (2006.01)
G02F 1/035 (2006.01)
G02F 1/135 (2006.01)

(52) U.S. Cl. .......................... 385/31; 385/39; 385/901; 362/561; 362/552; 362/610; 362/615; 349/62

(58) Field of Classification Search .................. 385/31, 385/39, 901; 362/600, 606, 608, 610, 615, 362/561, 552; 349/62–65, 112
See application file for complete search history.

(56) References Cited

U.S. PATENT DOCUMENTS

2002/0163529 A1* 11/2002 Evanicky ..................... 345/600
2004/0263718 A1* 12/2004 Tsai ............................. 349/62
2005/0030732 A1* 2/2005 Kimura et al. ................ 362/31

FOREIGN PATENT DOCUMENTS

| EP | 0 571 173 A2 | 11/1993 |
| JP | 03009306 | 1/1991 |
| JP | 2002008423 | 1/2002 |

* cited by examiner

*Primary Examiner*—Michelle Connelly-Cushwa
(74) *Attorney, Agent, or Firm*—McCarthy Tetrault LLP

(57) ABSTRACT

A hot spot filter for a light guide is created by taking an image of the light output pattern of an illuminated light guide. The hot spot filter may be a film, a layer, or an additional liquid crystal display dedicated to attenuating bright spots from the light guide. The hot spot filter may be incorporated into the image display by adjusting the grey scale of individual pixels to provide sufficient compensation.

14 Claims, 7 Drawing Sheets

METHOD AND DEVICE TO IMPROVE BACKLIGHT UNIFORMITY

FIELD OF THE INVENTION

The present invention relates to the field of liquid crystal displays and, particularly, to the field of backlighting for liquid crystal displays and/or keypads.

BACKGROUND OF THE INVENTION

Liquid crystal displays are often illuminated by a backlight. When developing an LCD or keypad lighting system, many challenges are encountered that limit the ability to provide a uniformly lit light source to the display or keypad. For example, constraints on the x, y, and z size of the backlight system require tradeoffs or compromises in achieving proper and sufficient optical performance. Especially in those cases where there is little space in the x or y directions (the planar extensions of the light guide), the light guide providing light to the display from a light source (e.g., light emitting diodes—LEDs) or a light source directly illuminating a display may illuminate areas of the display (or keypad) more strongly than other areas. The more strongly lit areas are often referred to as "hot spots" or "bright spots." Currently, the options to compensate for hot spots in LED illuminated LCDs and keypads are 1) moving the LEDs farther away from the light guide; 2) increasing the number of LEDs; or 3) creating a complex and difficult to tool optical dispersion patterns on the light guide plastic surface. The current methods have shortcomings. If x, y space is critical, then option (1) is not possible. Option (2) may be cost prohibitive. Option (3) in which creating a complex pattern is formed on the light guide, using current techniques, may increase the price of the light guide, extend the development time, and require difficult and/or expensive tooling for manufacture. Thus, there is a need to provide an effective and cost effective method for eliminating hot spots from an illuminated light guide in a space constrained arrangement.

SUMMARY OF THE INVENTION

This invention addresses the problem of making light to a keypad or display uniform in a space constrained device or system. In the present invention, a simple light guide and hot spot filter are presented. The hot spot filter may be a separate layer, a display device, or patterns simply applied through a mask to the light guide surface. In creating the hot spot filter, an image from the illuminated light guide is captured to show precisely how the uniformity varies in the x and y directions. Then, the measured data is used to create a mask that is applied above or directly to the surface of the side of the light guide facing the display or keypad. This may be accomplished by creating a film that locally filters the hot spot and non-uniform regions. For example, if there are two strongly lit areas at the top of a module, the mask may be a transparent piece of material with grey printing placed on the transparent piece to correspond to the hot spots of the light guide. The net effect would be a uniform light output from the top surface of the light guide module. Alternatively, the image content of the LCD may be dynamically changed to cover up or compensate for hot spots. That is, in the case where there are multiple hot spots, if a white screen were requested by applications software, a white screen with grey regions corresponding to the hot spots would be formed to reduce hot spot brightness and provide a uniform image.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Embodiments of present invention will now be described by way of example with reference to attached figures, wherein.

DETAILED DESCRIPTION

The present invention relates to a method and apparatus, especially a mobile station such as a handheld communications device, that eliminates bright spots (or hot spots) in the light output pattern from a light guide that illuminates a display. Preferably, the light guide is illuminated by a light source that includes one or more light emitting diodes (LEDs). The LEDs of the light source preferably will include red, green, and blue colours. Other colour schemes, such as cyan, magenta, and yellow, are contemplated by the present invention. Although the present invention is directed to a liquid crystal display per se, the preferred use of the LCD is in a mobile station, such as a wireless portable handheld communications device. Cell phones and pagers are amongst the many handheld devices contemplated by the present invention. Aside from illuminating a display, the method may be used to illuminate a keypad or keyboard, such as a keypad found on a mobile station, or other illuminable device or layer.

Figure 1:
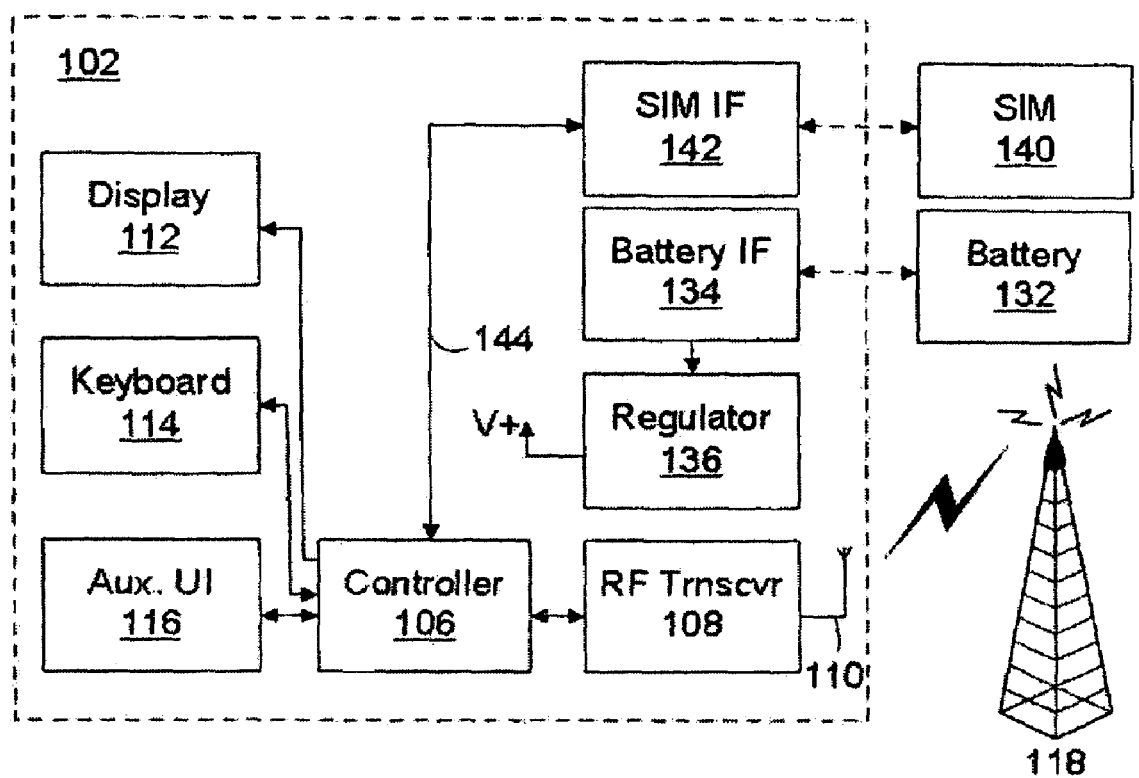
FIG. 1 is a block diagram that illustrates pertinent components of a wireless communications device that communicate within a wireless communication network according to the present invention.

FIG. 1 is a block diagram of a communication system 100 that includes a mobile station 102 that communicates through a wireless communication network. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal-processing operations associated with communication functions are typically performed in radio frequency (RF) transceiver circuitry 108. Controller 106 interfaces with device display 112 to display received information, stored information, user inputs, and the like.

Keyboard 114, which may be a telephone type keypad or full alphanumeric keyboard, is normally provided for entering data for storage in mobile station 102, information for transmission to network, a telephone number to place a telephone call, commands to be executed on mobile station 102, and possibly other or different user inputs.

Mobile station 102 sends communication signals to and receives communication signals from the wireless network over a wireless link via antenna 110. RF transceiver circuitry 108 performs functions similar to those of a base station and a base station controller (BSC) (not shown), including for example modulation/demodulation and possibly encoding/ decoding and encryption/decryption. It is also contemplated that RF transceiver circuitry 108 may perform certain functions in addition to those performed by a BSC. It will be apparent to those skilled in art that RF transceiver circuitry 108 will be adapted to particular wireless network or networks in which mobile station 102 is intended to operate.

Mobile station 102 includes a battery interface (IF) 134 for receiving one or more rechargeable batteries 132. Battery 132 provides electrical power to electrical circuitry in mobile station 102, and battery IF 134 provides for a mechanical and electrical connection for battery 132. Battery IF 134 is coupled to a regulator 136 which regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface (IF) 142. SIM 140 is one type of a conventional "smart card" used to identify an end user (or subscriber) of mobile station 102 and to personalize the device, among other things. Without SIM 140, the mobile station terminal is not fully operational for communication through the wireless network. By inserting SIM 140 into mobile station 102, an end user can have access to any and all of his/her subscribed services. SIM 140 generally includes a processor and memory for storing information. Since SIM 140 is coupled to SIM IF 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. The display may be a liquid crystal display (LCD), such as an LCD with colour filters or a field sequential LCD. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Figure 2:
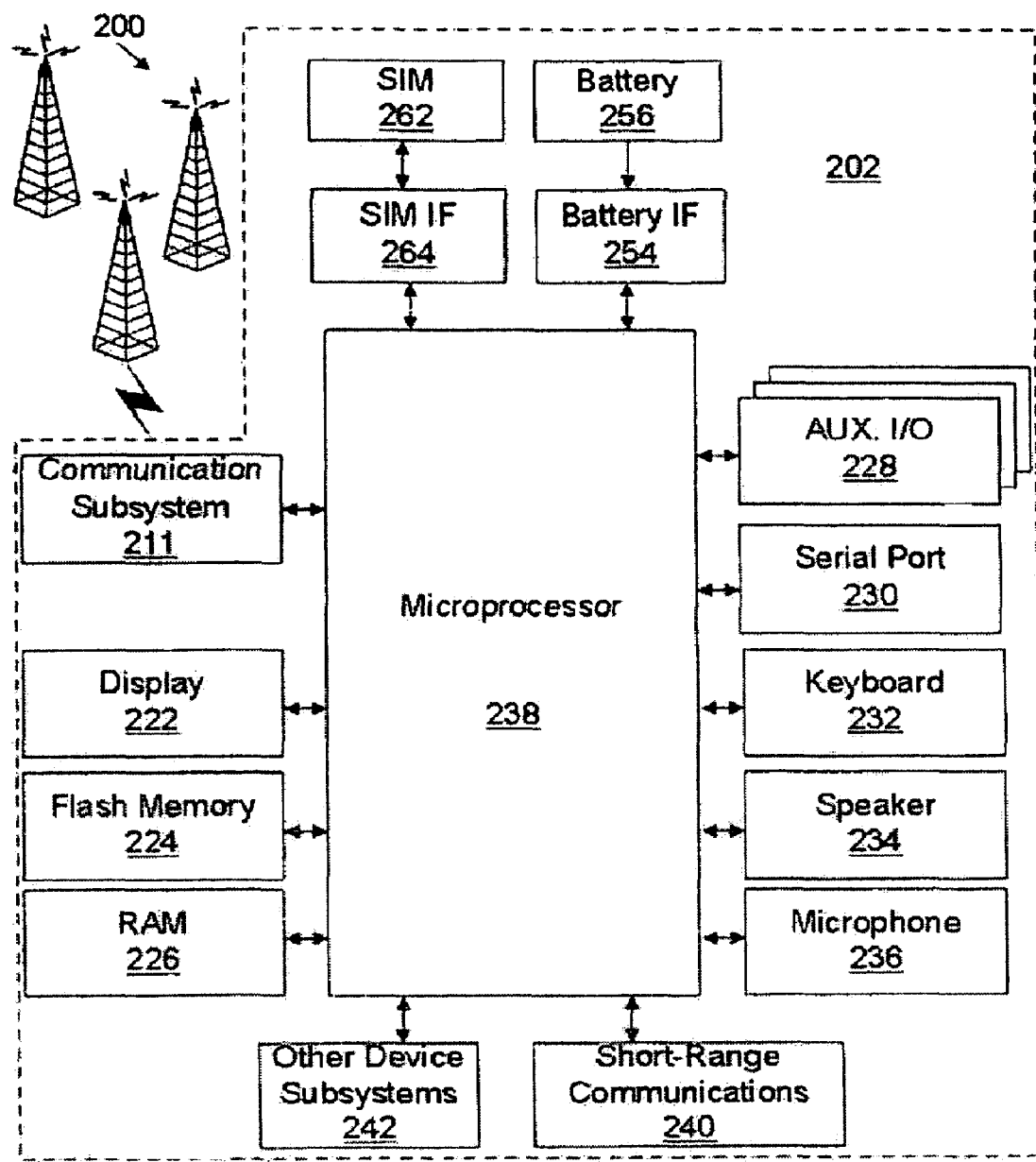
FIG. 2 is a more detailed diagram of a preferred wireless communications device of FIG. 1 according to the present invention.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver, a transmitter, and associated components, such as one or more (preferably embedded or internal) antenna elements and, local oscillators (LOs), and a processing module such as a digital signal processor (DSP) (all not shown). Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Network access is associated with a subscriber or user of mobile station 202 and therefore mobile station 202 requires a Subscriber Identity Module or "SIM" card 262 to be inserted in a SIM IF 264 in order to operate in the network. SIM 262 includes those features described in relation to FIG. 1. Mobile station 202 is a battery-powered device so it also includes a battery IF 254 for receiving one or more rechargeable batteries 256. Such a battery 256 provides electrical power to most if not all electrical circuitry in mobile station 202, and battery IF 254 provides for a mechanical and electrical connection for it. The battery IF 254 is coupled to a regulator (not shown) which provides power V+ to all of the circuitry.

Mobile station 202 includes a processor 238 (which is one implementation of controller 106 of FIG. 1) which controls overall operation of mobile station 202. Communication functions, including at least data and voice communications, are performed through communication subsystem 211. Processor 238 may be an integrated circuit such as a microprocessor, a processing core on an integrated circuit, a processor of a system on a chip, or the like. Processor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by processor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Processor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to the user such as, but not limited to, instant messaging (IM), e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network 200, an auxiliary I/O subsystem 228, serial port 230, short-range communications subsystem 240, or any other suitable subsystem 242, and installed by a user in RAM 226 or preferably a non-volatile store (not shown) for execution by processor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to processor 238. Processor 238 will preferably further process the signal for output to display 222, to auxiliary I/O device 228 or both as described further herein below with reference to FIGS. 3 and 4. A user of mobile station 202 may also compose data items, such as e-mail messages, for example, using keyboard 232 in conjunction with display 222 and possibly auxiliary I/O device 228. Keyboard 232 is preferably a complete alphanumeric keyboard or keypad and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

In accordance with an embodiment of the invention, mobile station 202 is a multi-tasking handheld wireless communications device configured for sending and receiving data items and for making and receiving voice calls. To provide a user-friendly environment to control the operation of mobile station 202, an operating system resident on station 202 (not shown) provides a graphical user interface (GUI) having a main screen and a plurality of sub-screens navigable from the main screen.

Figure 3:
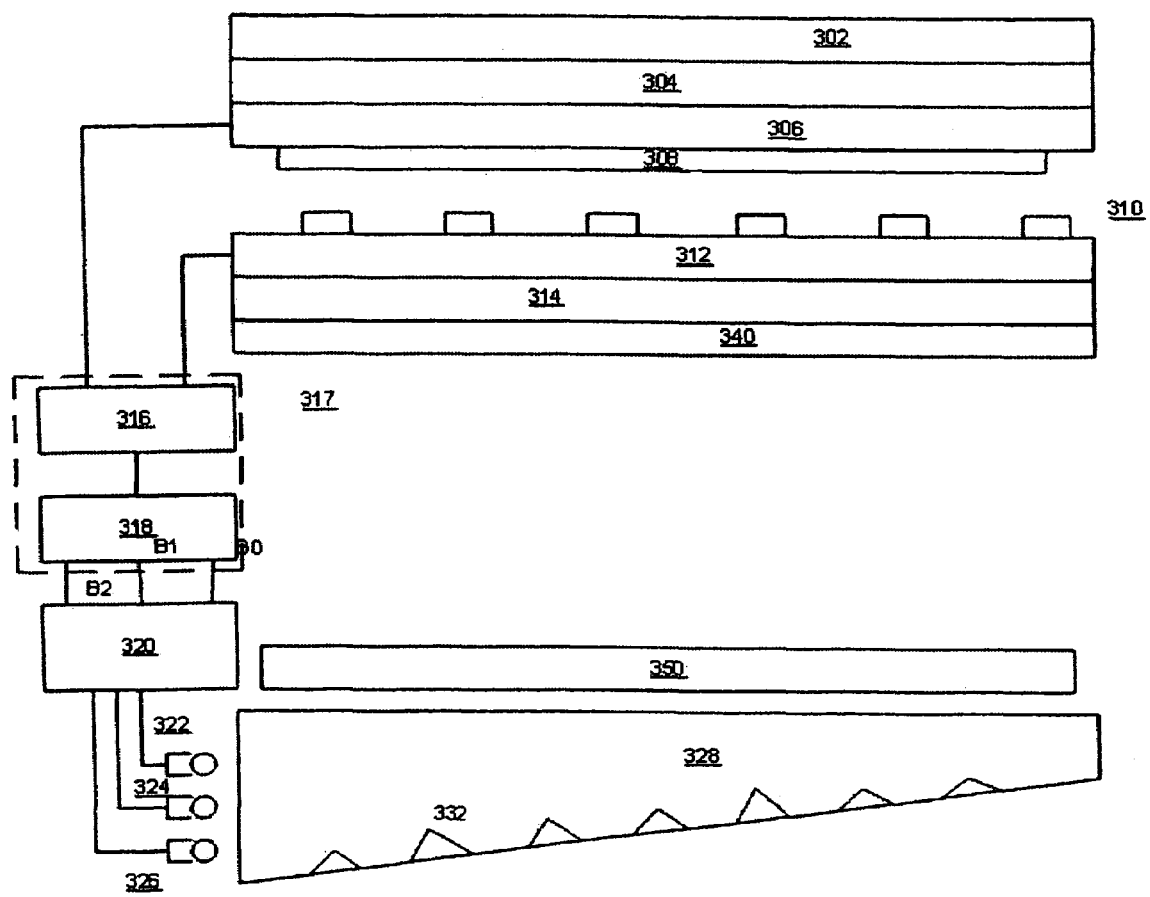
FIG. 3 illustrates an embodiment of a backlit liquid crystal display of the present invention.

A preferred embodiment of the liquid crystal display cell 222 is shown in greater detail in FIG. 3 in which a light source formed from multiple LEDs 322, 324, 326 is used as a backlight. The LCD may be a passive matrix or active matrix device. Preferably, the LCD is a full colour device. More preferably, the LCD is a field sequential LCD (FS LCD)—an LCD that obviates a need for colour filters. Alternatively, the LCD may contain colour filters in which case a white light source may be used. LCD controller 316 provides a voltage to the common electrode(s) 308 and the active elements 310 of the active matrix. The active elements are preferably thin film transistors. The common electrode(s) 308 and active elements of the LCD are supported on substrates 306 and 312, respectively. The LCD preferably contains a brightness enhancing film or layer 340 to optimize the distribution of light for a viewer. As the preferred liquid crystal material is super twisted nematic, polarizers 302 and 314 are used. The LCD controller 316 sets the pixel grey scale of the LCD. An optional processor 318 may coordinate synchronization of the LCD controller 316 with the light source controller 320. Preferably, the LCD controller 316 and the processor 318 are integrated into a single device 317, which may simply be referred to as an LCD controller that has the capability of controlling a light source controller 320. The light source may be implemented by using red, green, and blue LEDs 322, 324, 326. In a specific embodiment, four green, four red, and two blue LEDs are used to provide full colour and/or black and white display. Other combinations of LEDs are contemplated by the present invention. The LED controller 320 may sequence the three colours or may simultaneously energize LEDs of all the colours and terminate power to the LEDs simultaneously. The light guide 328 may have a tapered block construction and may have approximately a trapezoidal form to more evenly distribute the light into the LCD. The light guide may also have uneven areas 332 that scatter the light so as to avoid shadowing effects in the LCD image. Although uneven area 332 is shown to project inward to the surface of the light guide 328, the uneven areas may be arranged differently so long as the arrangement effectively scatters the light from the LEDs 322, 324, 326. The uneven areas may be abraded, molded, corrugated, chemically etched, or the like. Preferably, to maximize the utilization of light, the LEDs 322, 324, 326 and the light guide 328 are partially enclosed by a reflector such that the only opening is fully bounded by the light transmissive area of the LCD.

Figure 4:
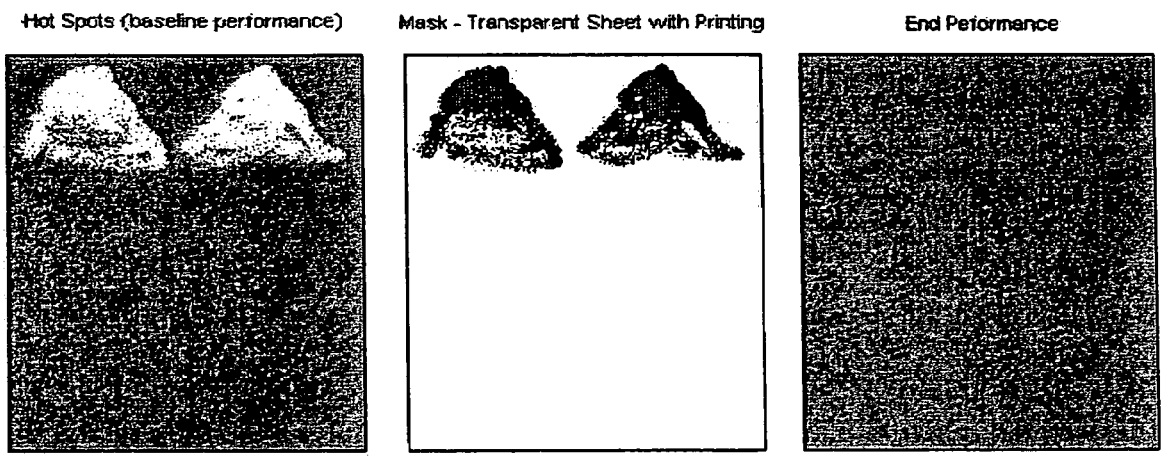
FIG. 4 illustrates an embodiment of a transparent sheet with filters to correct for the hot spots of the light guide.

FIG. 4 illustrates an exemplary embodiment of a light guide and a compensation sheet. The left image of FIG. 4 shows hot spots as seen from the LCD side of the light guide. The hot spot image may be captured directly from the light guide when the light guide is illuminated from its light source or may be captured through a filter. A mask is formed from the captured image in a pattern that mirrors the pattern of light from an illuminated light guide. The mask, shown in the center image of FIG. 4, may be a sheet or film with apertures. The hot spot filter may be a transparent sheeting with printing or coating in select areas corresponding to the hot spots. The printing or coating may be light absorptive or partially light reflective. Light absorbing pigments may offer lower cost in making. Partially light reflective (and partially light transmissive) coatings aid to recycle light and so reduce power consumption since less power needs to be expended for illumination. The degree of reflectivity/transmissivity of a hot spot compensating region on a hot spot filter may be adjusted according to the particular application. Alternative to a transparent sheet with printing or coating, a bitmap correction filter may be applied for a software solution to the LCD image such as when a shutter (e.g., another LCD) is used to establish lowered transmissivity regions over the hot spots. The end result of the hot spot compensation layer or shutter is a uniform planar light to the LCD.

Figure 5:
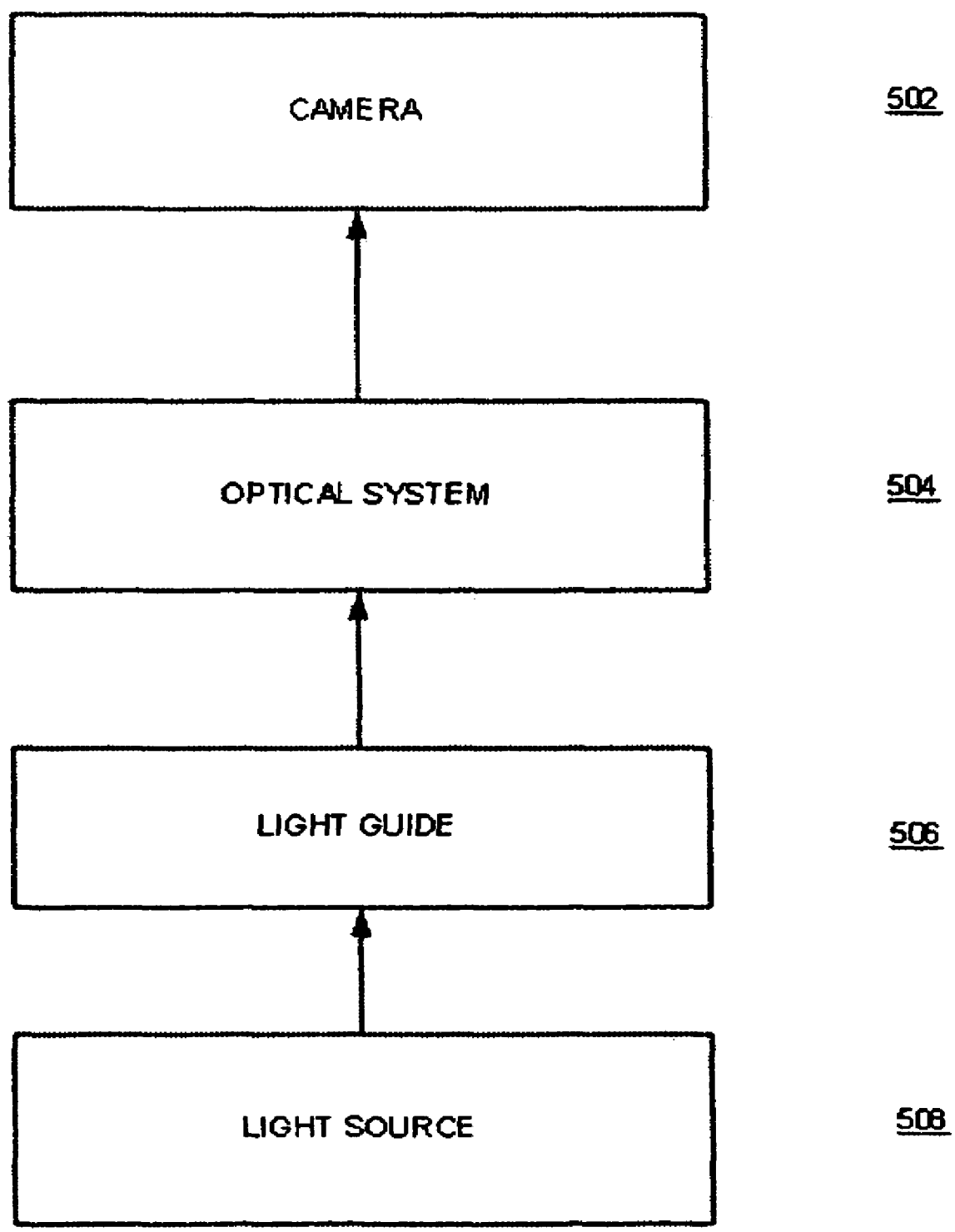
FIG. 5 illustrates an embodiment of an image capture method for capturing an image from which a filter is formed.

FIG. 5 illustrates an exemplary embodiment of an optical system that captures the light distribution from a light guide 506 when illuminated by a light source 508. The light source may include one or more light emitting diodes. For a full colour liquid crystal display, an image may be captured for each colour of light. Capturing an image for each colour of light allows for a more accurate hot spot filtering pattern to account for physical offsets in location for the light emitting diodes of each colour. For example, because a red LED is not located where a green LED is, the light output pattern from a light guide illuminated by the red LED is not likely to be identical to the light output pattern from the light guide illuminated by the green LED. Furthermore, a light guide image may be obtained from each individual LED of the backlight. This is especially useful where more than one LED is used per colour. The light output pattern from the light guide 506 may be optically processed through an optical system 504 that transfers to appropriately scaled imaged to a receiving sensor array with a camera 502. In an embodiment, the optical system 504 may include one or more lenses. The camera 502 may, for example, include a charge-coupled device (CCD).

Figure 6:
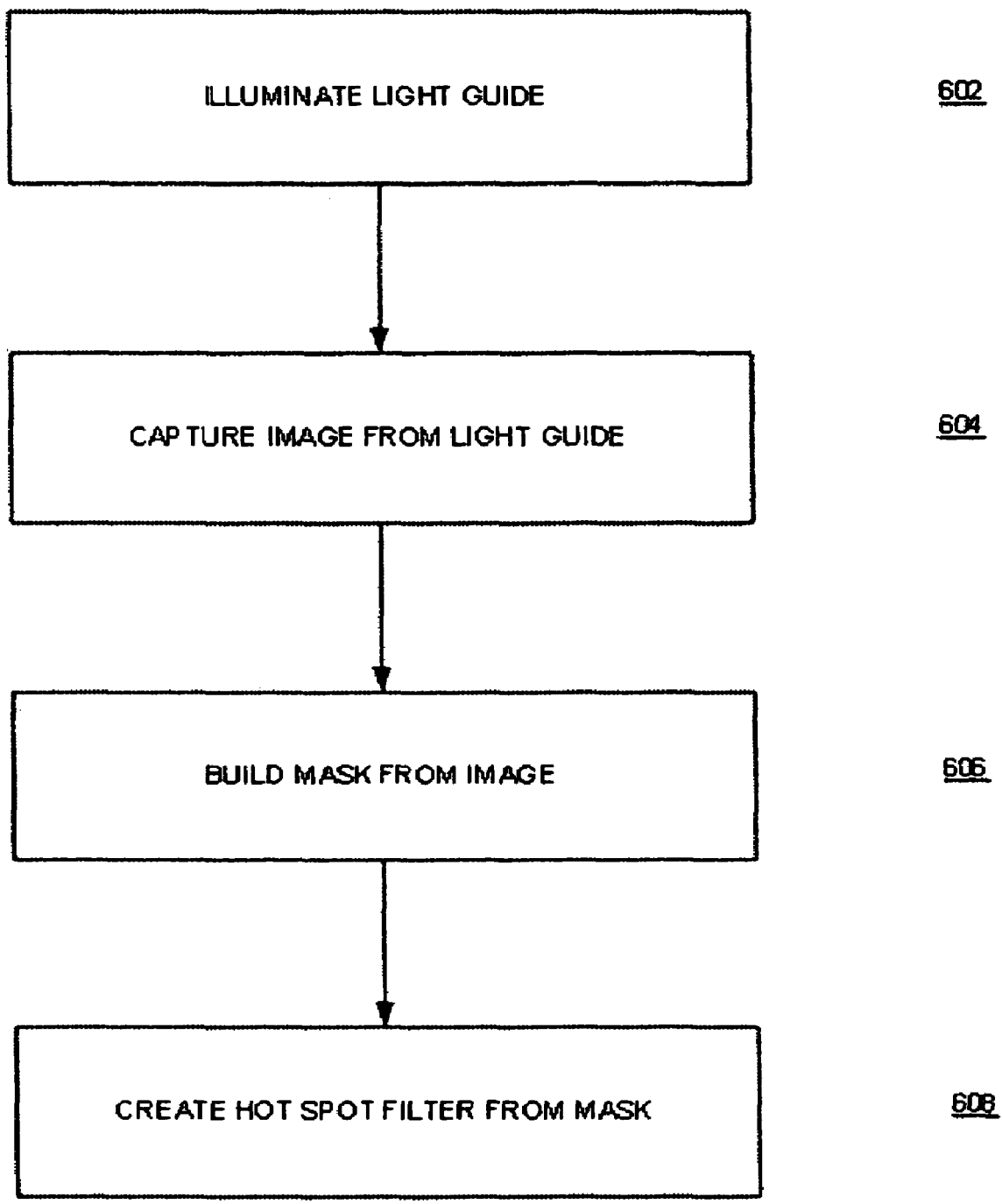
FIG. 6 illustrates an embodiment of a method for forming a hot spot filter.

FIG. 6 illustrates an embodiment of a method for creating a hot spot filter for the light guide. The light guide is illuminated to provide a light output pattern by an individual LED (e.g., white, red, green, or blue) or a group of LEDs representing a colour in step 602. The light output pattern may be optically processed. This light output pattern is captured as an image by a light-capturing device, such as a camera 604. The captured image may be used to make a mask 606. This mask, in turn, is used to form the hot spot filter 608. For example, the mask may contain apertures shaped and sized to conform to the hot spots. The mask may be laid over or upon a substrate, such as a plastic or glass film, and a coating or printing process deposits reflective and/or absorptive material onto the substrate through these apertures. After further processing (e.g., heating, drying, ultraviolet or infrared curing), the substrate is ready for disposition over the light guide in the finished product. The image capturing process may be performed from an actual handheld wireless device that is opened to expose the light guide. In such case, the camera may be disposed at a distance corresponding to that of the LCD's location within the finished product. This image capturing process may be performed once per batch or at a designated sampling rate to account for component devices from batch to batch.

Figure 7:
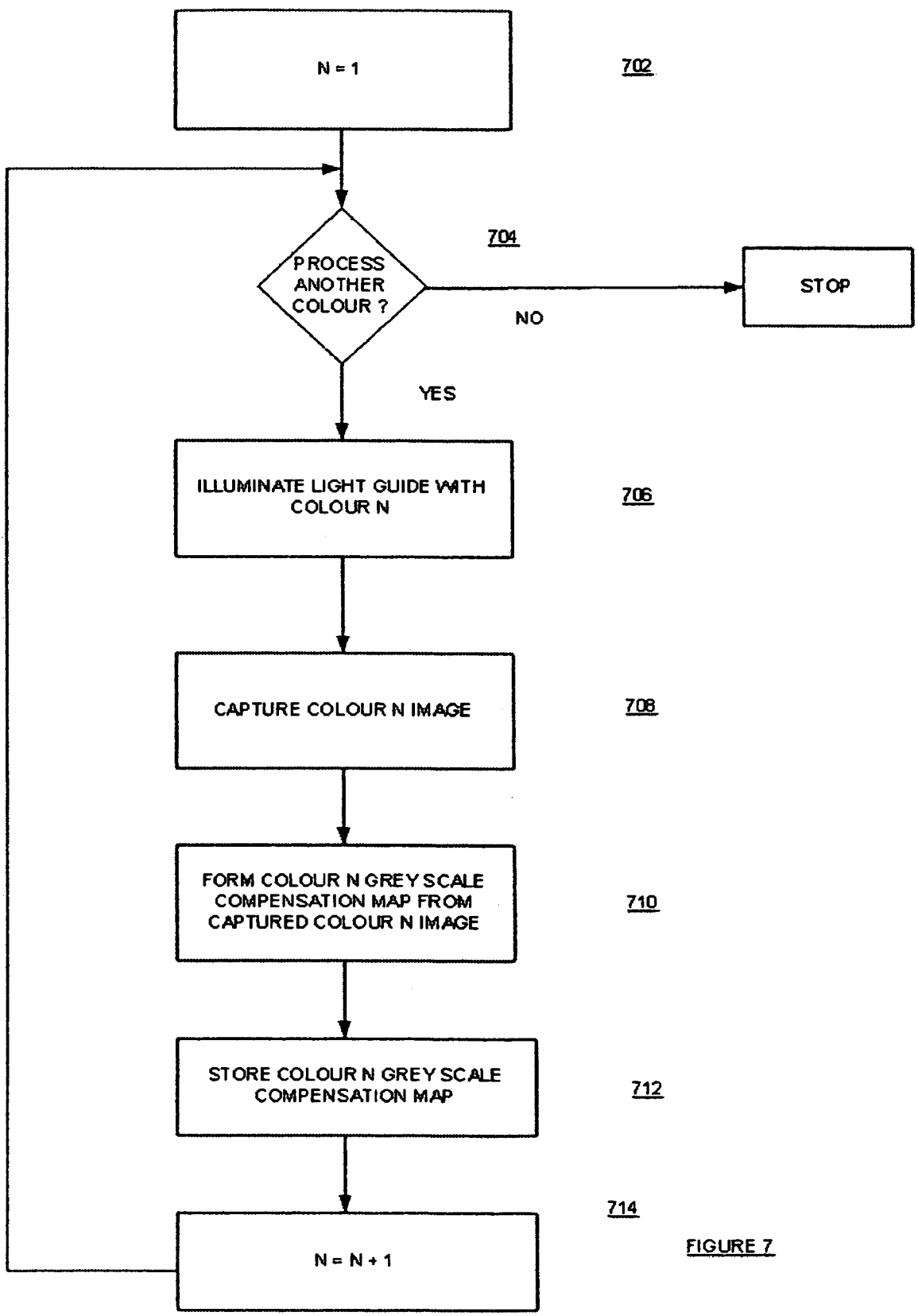
FIG. 7 illustrates an embodiment of a method for forming a hot spot compensation map for light sources of different colours.

FIG. 7 illustrates another method for creating a hot spot filter. In FIG. 7, a colour grey scale compensation map is created for each colour of light illuminating the LCD. First, one of the colours is selected 702 in which light of that colour illuminates the light guide 706. The image from the light guide for that colour is captured 708. The captured image is processed to form a compensation map 710 to eliminate hot spots through use of the hot spot filter. In this case, the hot spot filter may be a film or layer (350 of FIG. 3) upon which printing or coating of the hot spot areas is performed, may be such printing or coating directly upon the light guide, may be another liquid crystal display that is able to alter the pixel by pixel grey scale to compensate for any hot spots, or may be the primary LCD (defined by substrates 312 and 306 in FIG. 3) in which certain pixels are given an added darkened grey scale value for compensation. The grey scale compensation map for the colour is stored in a suitable memory (e.g., the flash memory). The method determines if another colour of LED is to be processed 714, 704. In this way, distinct image patterns may be obtained for each colour of light generated by the light source.

The above-described embodiments of the present application are intended to be examples only. Those of skill in the art may effect alterations, modifications and variations to the particular embodiments without departing from the scope of the application. Instead of a liquid crystal display, a keypad or keyboard may be illuminated using the disclosed techniques. The invention described herein in the recited claims intends to cover and embrace all suitable changes in technology.

We claim:

1. A method of compensation for non-uniform illumination from a light guide, comprising:
   determining a first portion of the light guide that provides greater light output relative to a second portion of the light guide when illuminated by a backlight;
   determining a first compensation pattern for generation on a liquid crystal display (LCD) to block light from the first portion relative to light from the second portion;
   incorporating the first compensation pattern into an image to be displayed on the LCD; and
   displaying the image with the incorporated first compensation pattern on the LCD, wherein
   the LCD is located about the light guide such that when the first compensation on pattern is generated on the LCD, the first compensation pattern aligns with the first and second portions to reduce the intensity of light passing through the first compensation pattern from the first portion realative to the intensity of light passing through the first compensation pattern from the second portion.

2. The method of claim 1, wherein a second compensation pattern is provided to further to reduce light emitted from the first portion relative to light emitted from the second portion.

3. The method of claim 2, wherein the second compensation pattern is a coating deposited upon the light guide.

4. The method of claim 2, wherein the second compensation pattern is provided on a transparent substrate.

5. The method of claim 4, wherein the second compensation pattern includes a coating upon the transparent substrate.

6. A display system, comprising:
a liquid crystal display (LCD);
a backlight for the LCD;
a light guide to channel light from the backlight to the LCD, the light guide having a first portion that emits more light relative to a second portion when illuminated by the backlight;
a stored representation of a first compensation pattern for generation on the LCD to block light from the first portion relative to light from the second portion;
a module to incorporate the stored representation into an image to be displayed on the LCD; and
a module to generate the image with the stored representation for display on the LCD, wherein
when the first compensation pattern is generated on the LCD, the first compensation patter aligns with the first and second portions to reduce the intensity of light passing through the first compensation pattern from the first portion relative to the intensity of light passing through the first compensation pattern from the second portion.

7. The display system of claim 6, wherein the LCD is a field sequential LCD.

8. The display system of claim 6, further comprising a layer between the light guide and the LCD, the layer providing a second compensation pattern to further reduce the intensity of light emitted from the first portion relative to the intensity of light emitted from the second portion.

9. The display system of claim 8, wherein the layer includes a transparent substrate.

10. The display system of claim 9, wherein the transparent substrate has at least one area that transmits light different from another area of the transparent substrate.

11. The display system of claim 10, wherein the at least one area includes a coating.

12. The display system of claim 10, wherein the at least one area includes a printing.

13. The display system of claim 6, wherein the light guide has at least one area with a coating to attenuate the light from the first portion.

14. The display system of claim 6, wherein the image with the first compensation pattern is used to alter a grey scale level of at least one pixel on the LCD to reduce the intensity of light passing through the first compensation pattern from the first portion relative to the intensity of light passing through the first compensation pattern from the second portion.

* * * * *